Gert Schrader
Hans J. Anders
INVENTORS.

United States Patent Office 3,497,038
Patented Feb. 24, 1970

3,497,038
PISTON-AND-CYLINDER ARRANGEMENT INCLUDING SEAL
Gert Schrader, Walldorf, Hesse, and Hans Joachim Anders, Frankfurt am Main, Germany, assignors to Alfred Teves G.m.b.H., Frankfurt am Main, Germany, a corporation of Germany
Filed July 9, 1968, Ser. No. 743,455
Claims priority, application Germany, July 12, 1967,
T 34,295
Int. Cl. F16j 15/18, 9/14
U.S. Cl. 188—152                              7 Claims

ABSTRACT OF THE DISCLOSURE

A piston-and-cylinder arrangement for a disk brake has a cup-shaped ceramic piston sealed against a cylinder by a rubber cuff or dust cap held against the rim of the cylinder by a retaining ring and held on the piston by an annular retaining cup. The outer axial flange of the cup holds an inner periphery of the seal against the stepped end of the piston proximate to the brakeshoe and is held in turn on the piston by springlike tongues on an inner axial flange engaging the interior of the cup-shaped piston so that no machining of the latter is necessary.

---

Figure 1:
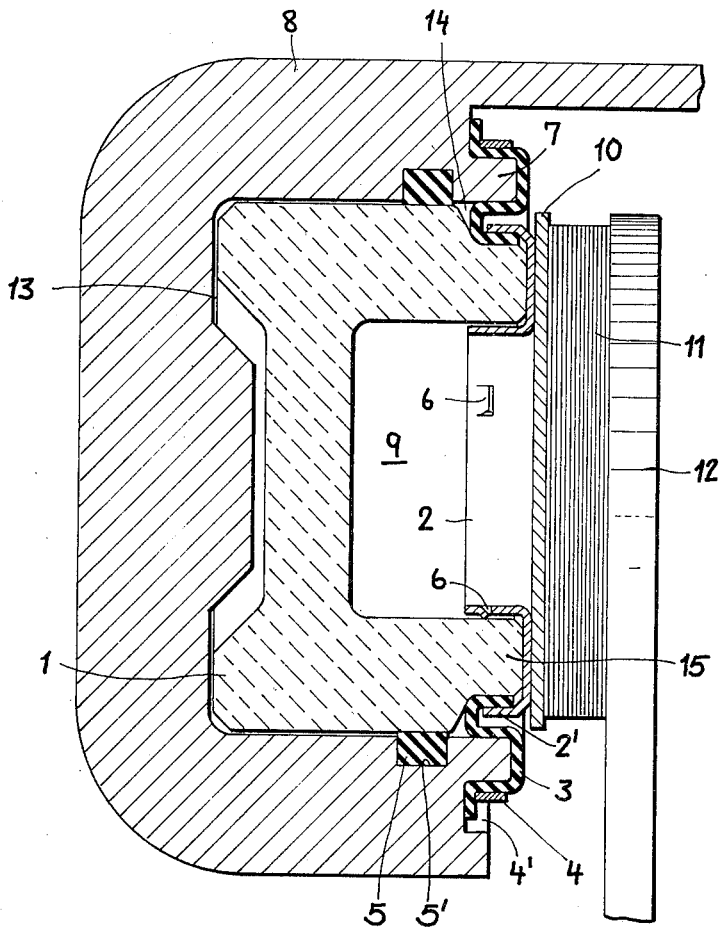

Our present invention relates to a piston-and-cylinder arrangement, especially for a disk brake of an automotive vehicle. In particular, our invention relates to sealing arrangements for a cylinder assembly for such a brake having a ceramic or similarly constituted piston.

With metallic disk-brake pistons it is the practice to provide an annular gasket to protect the piston from dust and water and other contaminants. Such a gasket may be connected to the wheel cylinder by a retaining ring and is held in a circular groove in the face of the piston by a second snap ring.

Such an arrangement is advantageous for metallic pistons, but leaves a great deal to be desired when a ceramic or similarly constituted piston is used because of its heat and corrosion resistance and its low thermal conductivity. Due to the brittleness and nonmachinability of such materials, the edges of the groove in which the seal is mounted tend to crumble during use and thereby allow the seal to become disconnected from the piston. This permits water and dust to enter the brake thus bringing about corrosion and fouling of the same. Furthermore, the difficulty of machining the piston to form the groove leads to increased manufacturing cost.

It is an object of our invention to provide a piston-and-cylinder arrangement using a ceramic or similarly constituted piston that is sealed in such a manner as to spread the strain caused by the sealing cuff over a greater area of the piston thereby decreasing the tendency toward crumbling.

This is done by molding the ceramic piston by conventional ceramic-shaping techniques with an end portion of smaller diameter than the remainder of the piston. The outer periphery of the annular seal is held against the cylinder in the above-described manner whereas the inner periphery is retained against this stepped end of the piston by a retaining cup whose outer axially extending annular flange fits over the end and the internal periphery of the cuff. This cup compresses the inner periphery against the piston all around the piston, thereby providing an excellent seal while not subjecting a small area of the brittle piston to a great strain and causing the piston to crumble.

According to another feature of this invention, the annular retaining cup is formed like a doughnut cutter, that is of a U-section piece of metal drawn into the U, the latter opening axially toward the piston and having its flattened bight (perpendicular to the axis of the piston) bearing against the backing plate of the brakeshoe. In this manner the inner and outer coaxial, cylindrical and parallel flanges of the retaining cup just fit over the inner and outer cylindrical surfaces of the rim of the cup-shaped piston. We also provide small spring-like tongues on the interior cup wall engaging the interior piston wall to hold the cup firmly in place on the piston.

In this manner, the heat- and corrosion-resistant properties of a ceramic piston can be exploited while the disadvantage of not being able to seal it effectively is avoided.

Figure 2:
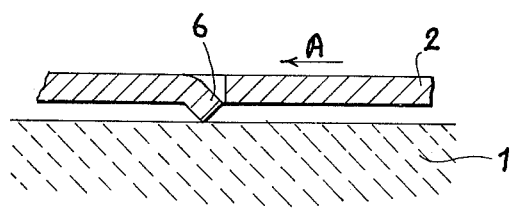

The above and other objects, features and advantages of the invention, which will become apparent hereinafter, are described below with reference to the accompanying drawing in which:

FIG. 1 is a section through a disk brake equipped with the cylinder arrangement according to our invention; and FIG. 2 is a detail of FIG. 1 in an enlarged scale.

A cup-shaped ceramic piston 1 whose mouth is turned toward the brakeshoe, is axially displaceable in a cylinder 8 sealed thereagainst by a sealing ring mounted in a recess 5' in the cylinder wall. A backing plate 10 of the brakeshoe carries the brake lining 11 and is urged by the piston 1 under hydraulic pressure supplied to the cylinder chamber 13 to force the shoe 10, 11 to engage frictionally one face of a brake disk 12.

The piston 1 has a stepped end portion 14 of reduced external diameter and a cavity 9 which together define a rim 15. An oil-resistant rubber cuff 3 having a substantially S-shaped cross section is held by its outer periphery against the outside of this rim 15 via an axially extending cylindrical outer peripheral flange 2' of the annular retaining cup 2. This cup 2 fits over the rim 15 and has an axially extending cylindrical inner peripheral annular flange 2'' engaging the interior wall of this rim 15 by means of three springlike tongues 6, one shown in sectional detail in FIG. 2. These tongues 6, which represent a number of angularly equispaced pawl-like members diverging from the axis toward the interior of the piston, engage the rough interior of the ceramic piston 1 in such a way that the cup 2 can be pushed on in the direction of arrow A with no difficulty but resist displacement in the opposite direction so that it does not readily slip off. The outer periphery of the cuff 3 is held against a rim 7 of the cylinder 8 by a ring 4 received in the groove 4' open toward the brakeshoe.

We claim:
1. A hydraulic piston-and-cylinder arrangement, comprising:
   a fluid cylinder having an open side;
   a piston axially displaceable in said cylinder, said piston being formed with a stepped end portion at said open side;
   a flexible annular sealing cuff having an outer periphery engaging said cylinder and an inner periphery engaging said stepped end portion;
   a cup-shaped body receiving said end portion at said piston and retaining said inner periphery in sealing contact therewith;
   a brake disk rotatable adjacent said open side of said cylinder, said piston being ceramic and being formed with an axial cavity opening toward said disk;
   a brakeshoe between said piston and said disk and frictionally engageable with said disk on axial displacement of said piston toward said disk;
   an axially extending inner annular flange on said body receivable in said cavity;
   a plurality of angularly equispaced resilient metallic tongues formed on said flange and engaging the wall of said cavity while diverging outwardly away from said disk;

an axially extending outer annular flange on said body holding said inner periphery against said piston; and a ring, said cylinder being formed with an annular rim, said ring retaining said outer periphery in sealing contact with said rim.

2. A hydraulic piston-and-cylinder arrangement comprising:

a fluid cylinder having an open side;

a cup-shaped piston axially displaceable in said cylinder, said piston being formed with a stepped end portion at said open side and being open in the direction thereof to form an annular rim;

a flexible annular sealing cuff having an outer periphery engaging said cylinder and an inner periphery engaging said stepped end portion along the exterior thereof; and a cup-shaped body receiving and fitting over said end portion of said piston and retaining said inner periphery of said cuff in sealing contact therewith, said body having an annular surface overlying said rim in contact therewith and interposable between said piston and a load actuatable thereby, and an annular flange clamping an external surface of said cuff against said piston.

3. The arrangement defined in claim 2, further comprising an axially extending inner flange on said body receivable in said cavity.

4. A hydraulic piston-and-cylinder arrangement, comprising:

a fluid cylinder having an open side;

a piston axially displaceable in said cylinder, said piston being formed with a stepped end portion at said open side;

a flexible annular sealing cuff having an outer periphery engaging said cylinder and an inner periphery engaging said stepped end portion; and a cup-shaped body receiving said end portion of said piston and retaining said inner periphery in sealing contact therewith, said piston being formed with a cavity opening axially toward said body at said end portion;

an axially extending inner flange on said body receivable in said cavity; and at least one resilient tongue-like protrusion on said flange extending outwardly therefrom and engaging the wall of said cavity to hold said body in place on said piston.

5. The cylinder arrangement defined in claim 4 further comprising a ring, said cylinder being formed with an annular groove at said open side, said ring retaining said outer periphery in sealing contact with said cylinder in said groove.

6. The arrangement defined in claim 4 wherein said piston is nonmetallic.

7. The arrangement defined in claim 6 wherein said piston is ceramic.

References Cited

UNITED STATES PATENTS

| | | | |
|---|---|---|---|
| 1,195,546 | 8/1916 | Wrightson | 92—248 |
| 3,065,733 | 11/1962 | Hass | 74—18.2 |
| 3,302,473 | 2/1967 | Lowry et al. | |

FOREIGN PATENTS

| | | |
|---|---|---|
| 1,211,975 | 3/1966 | Germany. |

MILTON BUCHLER, Primary Examiner

G. E. A. HALVOSA, Assistant Examiner

U.S. Cl. X.R.

74—18.2; 92—168, 248; 188—100